Jan. 26, 1965     H. STAHLECKER     3,166,882
DEVICE FOR STOPPING SPINDLES Filed Aug. 9, 1962                                          9 Sheets-Sheet 1

INVENTOR
HANS STAHLECKER

BY Dicke + Craig
ATTORNEYS

Jan. 26, 1965  H. STAHLECKER  3,166,882
DEVICE FOR STOPPING SPINDLES
Filed Aug. 9, 1962  9 Sheets-Sheet 2

INVENTOR
HANS STAHLECKER

BY Dicke & Craig
ATTORNEYS

Fig. 4

Jan. 26, 1965   H. STAHLECKER   3,166,882
DEVICE FOR STOPPING SPINDLES
Filed Aug. 9, 1962   9 Sheets-Sheet 4

INVENTOR
HANS STAHLECKER

BY *Dicke + Craig*

ATTORNEYS

Jan. 26, 1965 H. STAHLECKER 3,166,882
DEVICE FOR STOPPING SPINDLES
Filed Aug. 9, 1962 9 Sheets-Sheet 6

Fig. 8

INVENTOR
HANS STAHLECKER

BY Dicke + Craig

ATTORNEYS

Jan. 26, 1965    H. STAHLECKER    3,166,882
DEVICE FOR STOPPING SPINDLES
Filed Aug. 9, 1962    9 Sheets-Sheet 8

INVENTOR
HANS STAHLECKER

BY *Dicke + Craig*
ATTORNEYS

Jan. 26, 1965  H. STAHLECKER  3,166,882
DEVICE FOR STOPPING SPINDLES
Filed Aug. 9, 1962  9 Sheets-Sheet 9

Fig. 12

INVENTOR
HANS STAHLECKER

BY Dicke + Craig
ATTORNEYS

United States Patent Office 3,166,882
Patented Jan. 26, 1965

3,166,882
DEVICE FOR STOPPING SPINDLES
Hans Stahlecker, Haldenstrasse 20, Sussen,
Baden-Wurttemberg, Germany
Filed Aug. 9, 1962, Ser. No. 215,980
Claims priority, application Germany Aug. 12, 1961
11 Claims. (Cl. 57—88)

The present invention relates to improvements in a device for stopping the rotation of the spindles of spinning or twisting machines which are driven by a common drive shaft by means of individual belts or cords, as described in the copending application of Fritz Stahlecker and Johannes Schurr, Serial No. 41,907 filed on July 11, 1960, which device is designed so as to permit the belt or cord connecting the drive pulley on the common drive shaft with the individual spindle to be lifted off the drive pulley and thereafter also to serve as a brake for quickly stopping the further rotation of the spindle.

The operation of such spindle brakes is preferably controlled by foot. It has, however, been found that the known foot-actuated control means, for example, in the form of a foot pedal which is supported on the floor or on rods on the intermediate frame members of the machine and the center of gravity of which is located at a short distance from the floor, have a series of disadvantages. They are not only expensive but also obstruct the free access to the inside of the machine and render it difficult and expensve to clean the machine.

It is an object of the present invention to provide a foot-controlled device for operating a spindle brake of the above-mentioned type which overcomes the disadvantages of the prior devices of this kind and is of an inexpensive and reliable construction and easy to operate. Basically, the invention consists in the provision of a foot-controlled device which is supported or guided on or within the spindle housing.

Depending upon the particular requirements of operation of the machine, the device according to the invention may be designed so as to permit the spindle brake to be merely applied and released by movements of the foot or also to be locked when the spindle brake is in the applied position so that the foot may then be removed from the foot pedal or similar element, or to permit the selective use of either of these forms of operating the spindle brake. If the device is of the type which may be locked, it may be designed either so that the locking effect may be attained automatically when the foot pedal or the like is depressed, while the unlocking requires an additional foot movement, or it may be designed so that the locking effect may require an additional foot movement while the foot pedal is being depressed or when it is in the depressed position whereas the unlocking may be effected more or less automatically by merely depressing the foot pedal slightly further and by then releasing the pressure on the pedal.

One of the numerous features of the invention consists in providing the device in the form of a flexible cable or band, one end of which is connected to the spindle brake and the other end to a stationary element, and in applying the brake by shortening the effective length of this cable by bending it out of its straight stretched position by means of a foot or knee-actuated pushrod or similar element. Such a device has the advantage that in order to apply the spindle brake the pushrod only needs to be moved for approximately one half of the distance which the belt-lifting element of the spindle brake has to be moved before it will stop the rotation of the spindle.

The invention further provides foot supporting means which are connected either to the spindle rail or to the spindle housing and are associated with the foot-actuated control means. Such foot supporting means are especially desirable in machines in which the spindle rail carries out elevating movements since the foot of the operator then always remains in the same position relative to the foot pedal or the like while the spindle rail together with the spindle housing and the elements therein carries out its vertical movements.

In order to prevent the spindle brake or the foot-actuated control means thereof or both from being over-loaded by an improper use of these control means, the invention further provides a buffer or compensating spring between the foot-actuated means and the spindle brake. In place of or in addition to such a spring, the invention further provides the foot pedal or the like to be designed either in such a manner that, when it is depressed excessively, the foot of the operator will automatically slide off the pedal or that the pedal will then yield resiliently without permitting the connecting rod of the pedal to be moved further downwardly.

The above-mentioned as well as further features and advantages of the invention will become more clearly apparent from the following detailed description of several preferred embodiments thereof as are illustrated in the accompanying drawings, in which:

FIGURE 11 shows a side view, partly in section, of a pedal which is resiliently mounted; while

Figures 1, 1A:
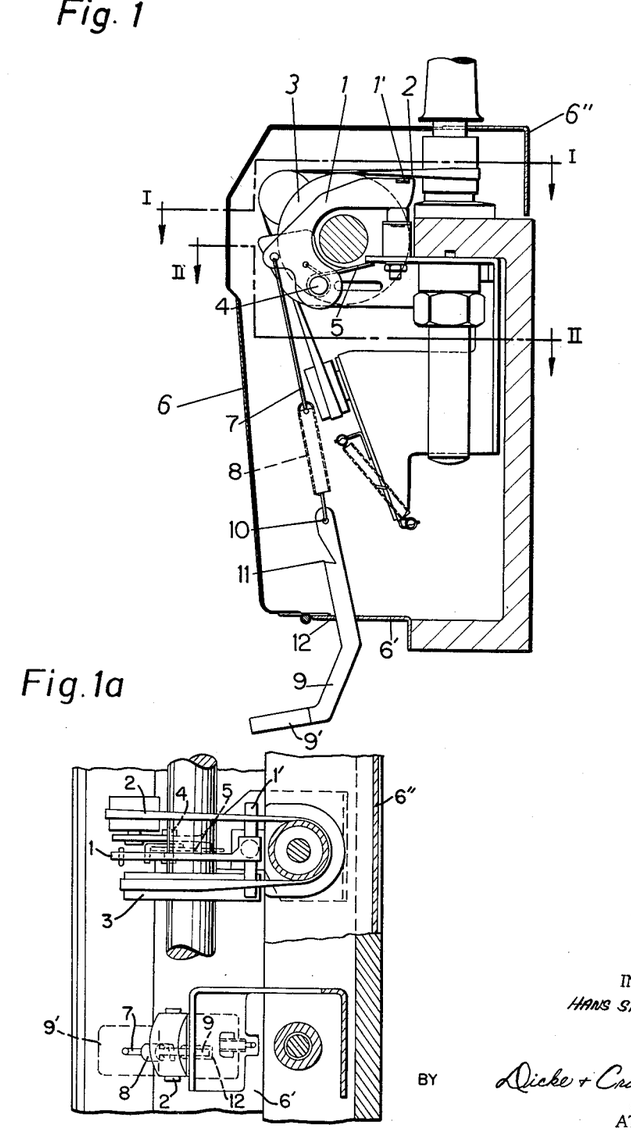
FIGURE 1 shows a vertical section through the spindle housing of one embodiment of the invention, in which the control means consist of a draw rod, a buffer spring, and an angular slide rod which is provided with a locking device and carries a foot pedal.
FIGURE 1a shows a plan view of FIGURE 1 taken along section lines I—I and II—II.
Figure 6:
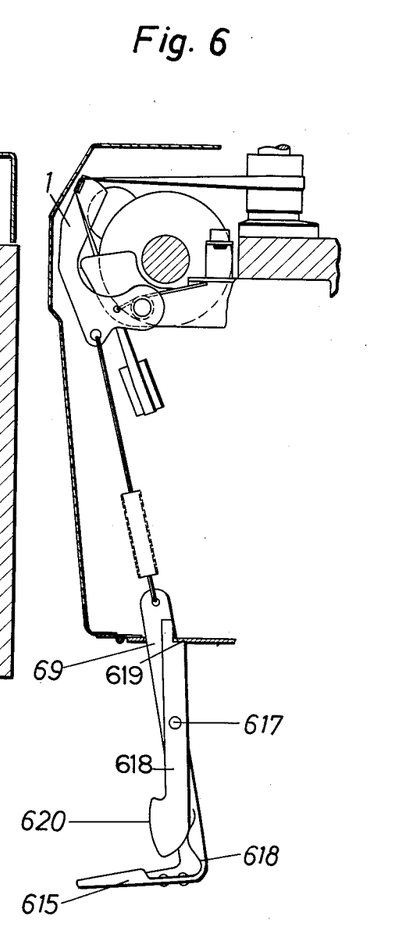
FIGURE 6 shows a corresponding view of a device similar to that according to FIGURE 5, in which, however, the engagement of the locking member is prevented by shifting the foot forwardly.

In the drawings, FIGURES 1 and 1a show a spindle drive mechanism in which the belt 2 may be lifted off the drive pulley 3 by means of an angular lever 1 which is pivotable about a pin 4 and is normally held in the inoperative position (as illustrated) by a spring 5. When lever 1 is pivoted to lift the belt 2 off the drive pulley 3, an additional tension and friction is applied upon the belt, whereby the rotation of the spindle is quickly stopped. The drive and brake mechanism is enclosed within a spindle housing which is formed by the spindle rail and the sheet-metal walls 6, 6' and 6" which are connected to the rail and one of which—the wall 6—forms the hinged front wall of the housing. Lever 1 is connected to a draw rod 7 which, in turn, is connected to a buffer spring 8 which is hooked on an angular slide rod 9. This rod 9 passes through and is guided by the edges of a slot 12 in the bottom 6' of the spindle housing, and its lower end forms a foot pedal 9'. If this pedal 9' is moved downwardly, this movement is transmitted through the buffer spring 8 and draw rod 7 to the lever 1 so that the latter is turned in the counterclockwise direction against the action of spring 5. A projection 1' on lever 1 then engages with and lifts the belt 2 off the drive pulley 3 so that the spindle is stopped. Lever 1 is then in the position as shown in FIGURE 6. If the foot which depresses the pedal 9' on rod 9 is then drawn forwardly, the detent 11 on rod 9 will be hooked under the front edge of slot 12 in the bottom 6' of the housing whereby the spindle brake is locked. If this should be avoided, it is only necessary to depress the pedal 9' slightly further while pushing it toward the rear so that the detent 11 will not engage with the front edge of slot 12. Spring 8 which has such a tension that it will not or only slightly be drawn out when the brake is properly applied, protects the brake mechanism from being subjected to an excessive load when the pedal is stepped upon too quickly or is depressed too far.

Figures 2, 3:
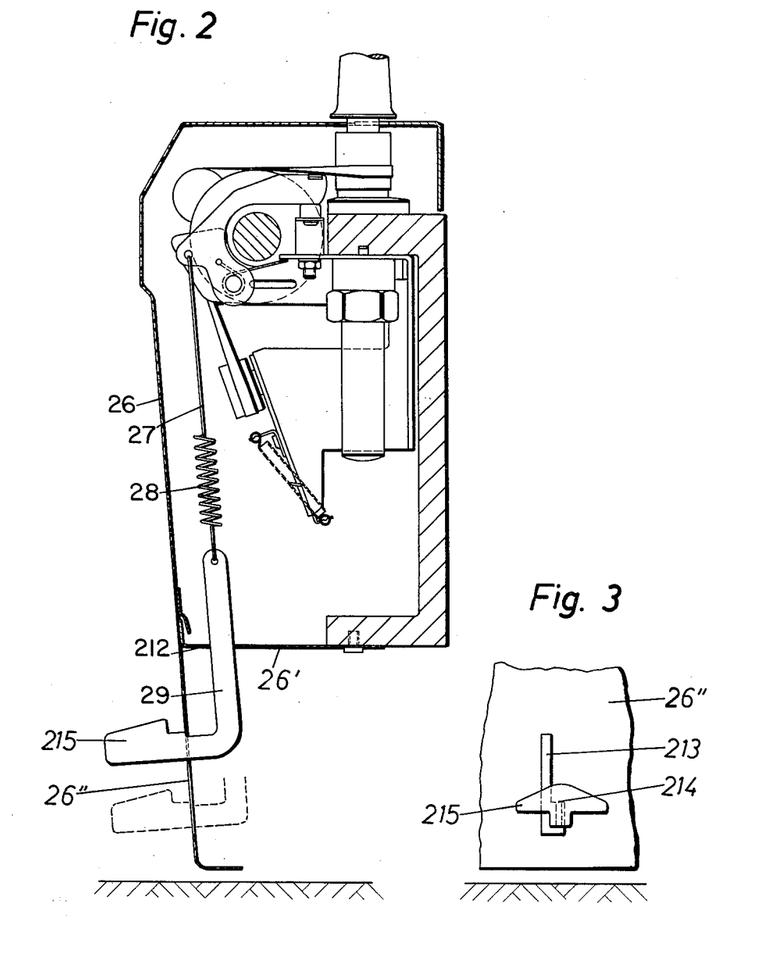
FIGURE 2 shows a similar view of a device in which the angularly bent slide rod is additionally guided in an extension of the front wall of the spindle housing.
FIGURE 3 shows a partial front view of the foot pedal on the slide rod according to FIGURE 2 but in the locked position.

In the embodiment of the invention as illustrated in FIGURES 2 and 3, the slide rod 29 is guided not only by the edges of the slot 212 in the bottom 26' of the housing, but also by the vertical edges of another slot 213 in an extension 26" of the front wall 26 along which the angular end forming the pedal 215 is slidable. At its lower end this slot 213 has a locking recess of a greater width. Pedal 215 is tapered downwardly toward both sides. Therefore, depending upon whether the operator steps upon one or the other side of the center of the pedal, a component is formed which pushes the slide rod 29 toward the right or left edge of slot 213. If the slide rod 29 is pushed toward the right, it slips near the end of its downward movement into the locking recess and is arrested by the upper edge 214 thereof, so that the brake is then held in the locked position. If the brake should not be locked the pedal should be stepped upon at the right side of its center so that slide rod 29 will slide downwardly along the left edge of slot 213.

Figure 4:
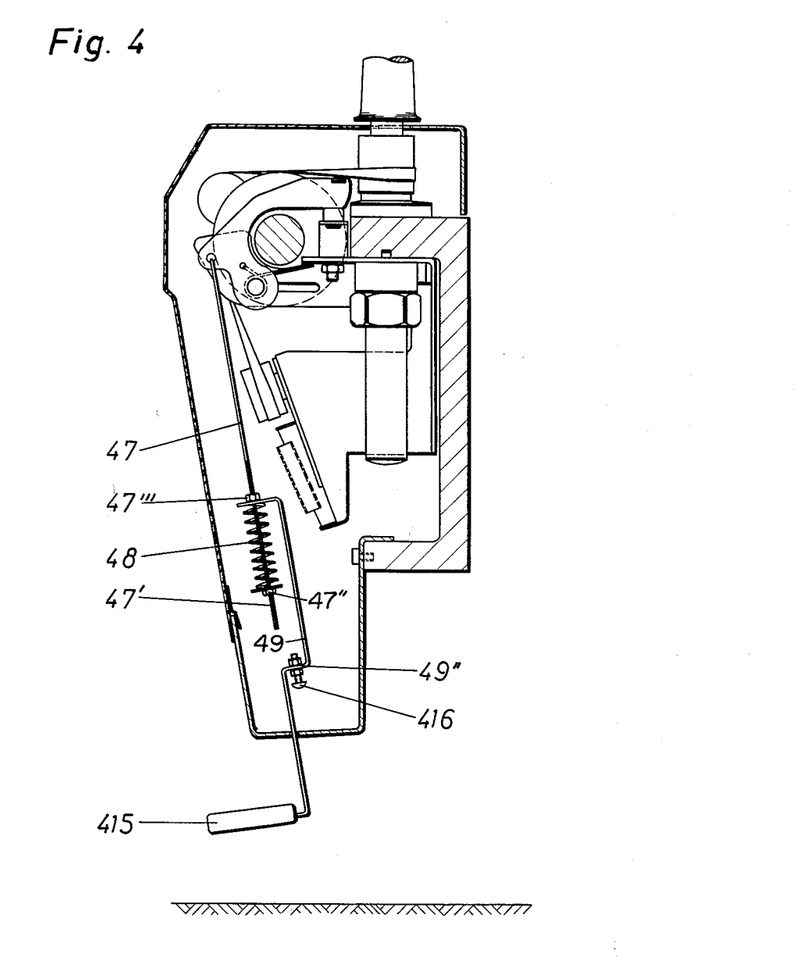
FIGURE 4 shows a view similar to FIG. 1 of a modification of the invention, in which a part of the draw rod forms a threaded spindle to permit the position of the foot pedal and the tension of the buffer spring to be adjusted.

According to the modification as illustrated in FIGURE 4, the lower end 47' of the draw rod 47 is provided with a screw thread and carries a compression spring 48 on a washer which is held under tension by a nut 47" which is screwed upon draw rod 47. The upper end of spring 48 engages upon the upper angular end of the slide arm 49 which is pressed by the spring against a nut 47''' on draw rod 47. Slide rod 49 carries at 49" a setscrew 416. By adjusting the nuts 47" and 47''' on draw rod 47, it is possible to vary the elevation of pedal 415 and also to adjust the initial tension of spring 48 in accordance with the most suitable conditions, while by means of setscrew 416 the extent of the downward movement of the pedal may be adjusted. The operator may thus be prevented from depressing the pedal too far and thus from fully compressing the buffer spring 48 which might cause an overload upon the various parts of the brake.

Figure 5:
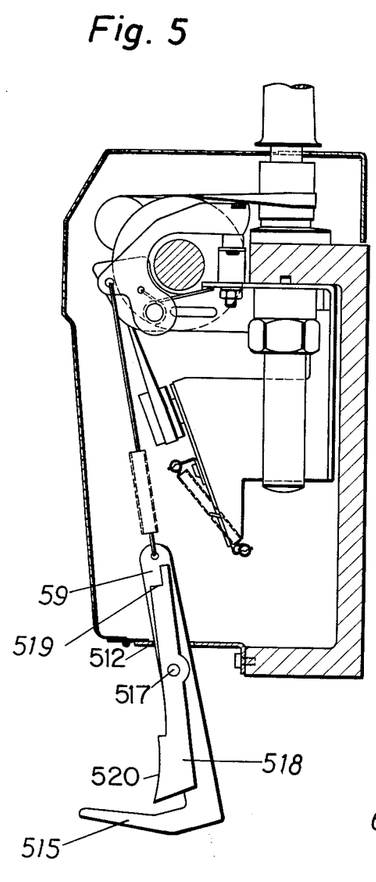
FIGURE 5 shows a view similar to FIGURE 1 of another modification, in which the foot pedal is provided with a locking member which may be engaged by shifting the foot forwardly.

In the further modification of the invention as shown in FIGURE 5, the slide rod 59 carries a pin 517 on which a two-armed lever 518 is pivotably mounted. This lever 518 has on its upper end a detent 519 and on its lower end a projection 520. If, when the pedal 515 is depressed to apply the brake, the foot is placed upon the pedal in such a position that the tip of the toe will press against the projection 520, the detent 519 on lever 518 will engage under the front edge of the guide slot 512 and thereby lock the brake in the applied position. For releasing the locking device, it is only necessary to press the pedal 515 slightly downwardly without engaging against the projection 520. By the gravity of lever 518 which if necessary may be supplemented by a spring, not shown, this lever will then turn in the clockwise direction so that the detent 519 will disengage from the front edge of the guide slot 512, and the brake will then be released.

FIGURE 6 shows a brake control mechanism similar to that according to FIGURE 5, in which, however, the two-armed lever 618 which is pivotably mounted on the slide rod 69 on a pin 617 is acted upon by a spring 618' which tends to turn the lever 618 in the clockwise direction. When the pedal 615 is depressed, the detent 619 on lever 618 snaps under the edge of the housing bottom and the brake is thus locked in the position as shown in FIGURE 6. For releasing the brake, the pedal 615 is pressed shortly downwardly and the toe of the foot is pushed against the projection 620, whereupon the pressure upon the pedal is released. If when applying the brake, it should not be locked, the pedal 615 is depressed while at the same time the toe is pressed against the projection 620.

Figure 7:
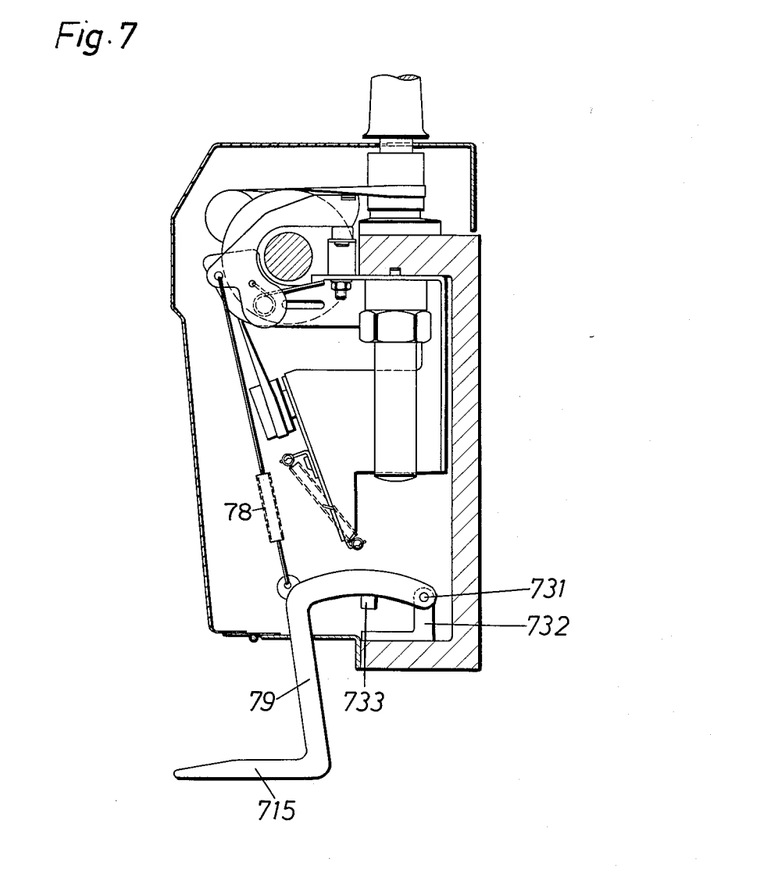
FIGURE 7 shows a view similar to FIGURE 1 of another modification in which the foot pedal is secured to an angular lever which is pivotably mounted at the inside of the spindle housing.

The brake mechanism according to FIGURE 7 is provided with a pedal 715 on an angular lever 79 which is pivotably mounted on a pin 731 on a bracket 732 which is secured to the spindle rail. A buffer 733 limits the extent of the downward movement of the treadle and prevents the elements of the brake from being overloaded. If the buffer 733 is made adjustable, the buffer spring 78 may, if desired, be omitted.

Figure 8:
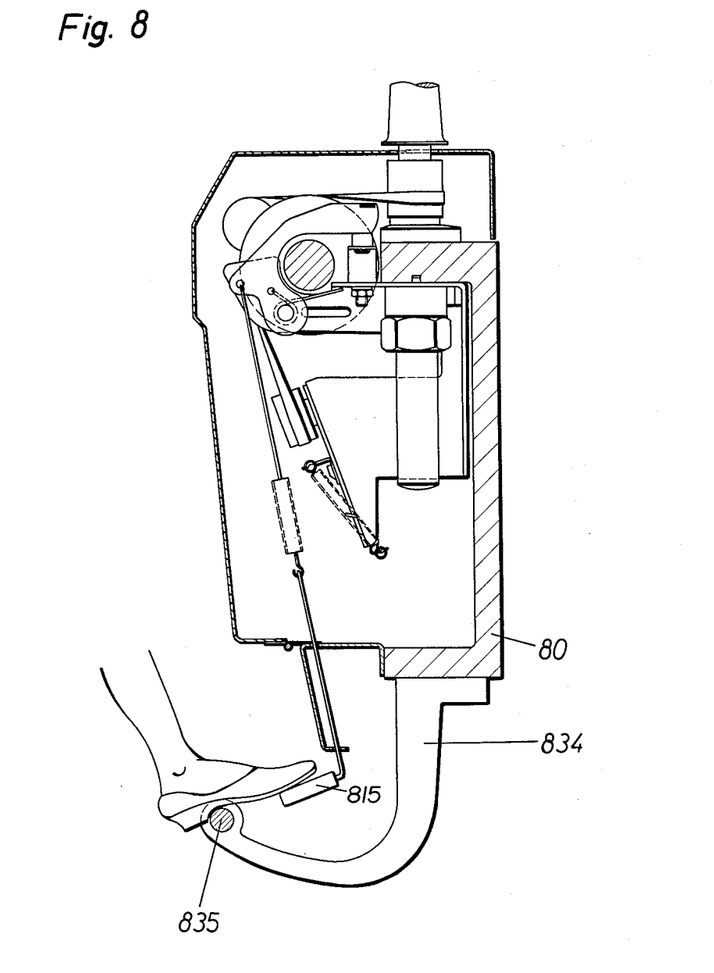
FIGURE 8 shows a view similar to FIGURE 1 of another modification, in which the spindle housing which is movable in a vertical direction is provided with a foot-supporting rail.

According to the further modification as shown in FIGURE 8, the spindle rail 80 carries arms 834, the ends of which are connected by transverse rods 835 which extend in the longitudinal direction of the machine and serve as a foot support. This construction is especially advisable if the spindle rail together with the spindle and spindle housing is movable in the vertical direction. Rods 835 then insure that the foot will always be at the same distance from the respective pedal 815.

Figure 9:
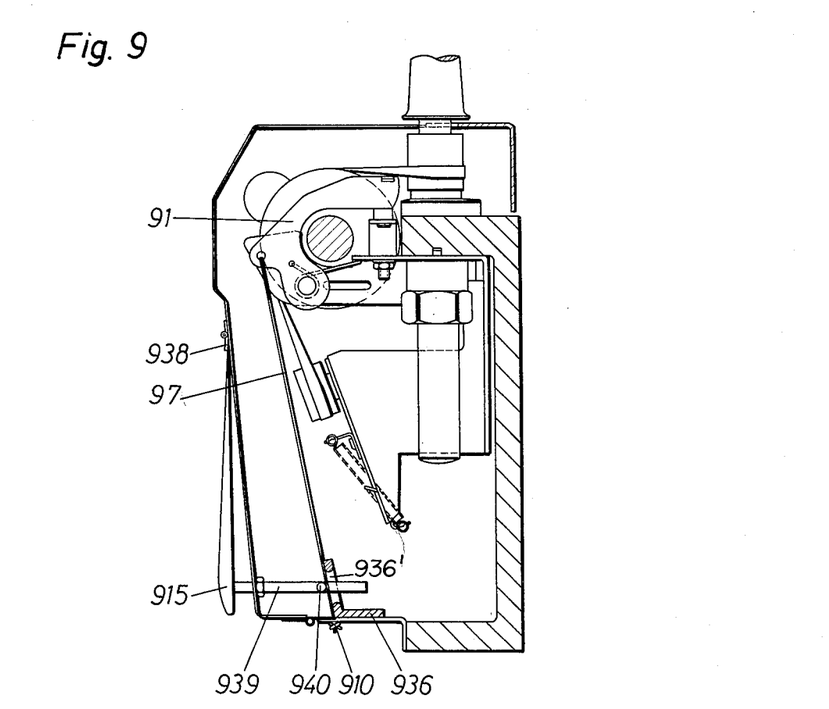
FIGURE 9 shows a view similar to FIGURE 1 of another modification, in which the control device for the spindle brake consists of a flexible member which is secured to a fixed point and the effective length of which may be shortened by bending it by means of a foot or knee-actuated push rod.
Figure 9A:
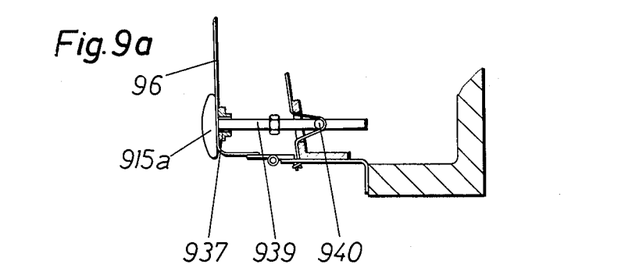
FIGURE 9a shows a partial view of a modification of the device according to FIGURE 9.

FIGURE 9 shows a brake mechanism in which a drawing element 97 in the form of a flexible cable or band is connected at its upper end to the brake lever 91 and on its lower end at 910—preferably adjustably—to the bottom of the housing. Behind the drawing element 97 an angle 936 which has an aperture 936' is secured to the bottom of the housing. A control plate 915 is pivotably connected at its upper end by a hinge or a leaf spring 938 to the front wall 96 of the housing, while its lower end carries a rod 939 which has a pin 940 thereon which, when the control plate 915 is depressed, presses against the flexible drawing element 97 and thereby pushes the same through the aperture 936', as illustrated in FIGURE 9a. Control plate 915 then has to be moved only for a distance which is approximately one half of the distance which the upper end of the cable or band 97 has to move with the brake lever 91 to pivot the latter as far as required. As shown in FIGURE 9a, the control plate may also be replaced by a control knob 915a, while the rod 939 may be guided in a bushing 937 which is secured to the front wall 96 of the housing. The devices as shown in FIGURES 9 and 9a may be operated either by the knee or the foot of the operator.

Instead of tightening the cable 97 by shortening its length by pushing a loop thereof through an aperture by means of a push rod, as shown in FIGURES 9 and 9a, it is also possible to do this by winding a part of the cable upon a roller on which the end of the cable is secured and which is rotated by a lever or rack by means of a pressure plate or the like.

Figure 10:
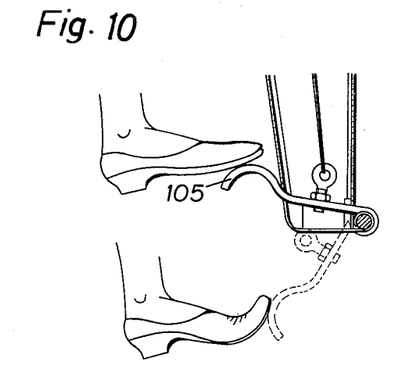
FIGURE 10 shows a side view, partly in section, of a foot pedal which is designed so that the foot will slide off the pedal when the latter is depressed beyond a certain point.
Figure 11:
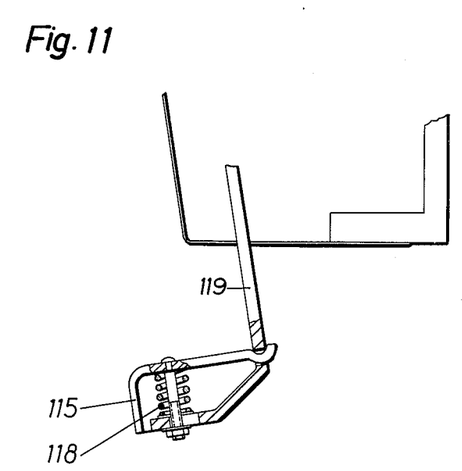

FIGURE 10 shows a further modification which comprises a pedal 105 in the form of a lever which is made of such a shape that, when the pedal is depressed too far, as indicated in dotted lines, the foot will slide off its surface. In place of such a simple means of preventing the brake mechanism from being overloaded, it is also possible, as shown in FIGURE 11, to employ a pedal 115 which is resiliently mounted on the slide rod 119 and is held in its normal position by a spring 118. The pressure of this spring may be adjusted so that the spring will not be compressed as long as the brake is properly operated. If, however, the pressure upon the pedal is applied too quickly or too strongly, the pedal will pivot downwardly. This is an indication to the operator that the foot pressure should not be further increased. If the pedal is then further depressed, the foot will slide off the pedal since it is then at a very inclined position.

Figure 12:
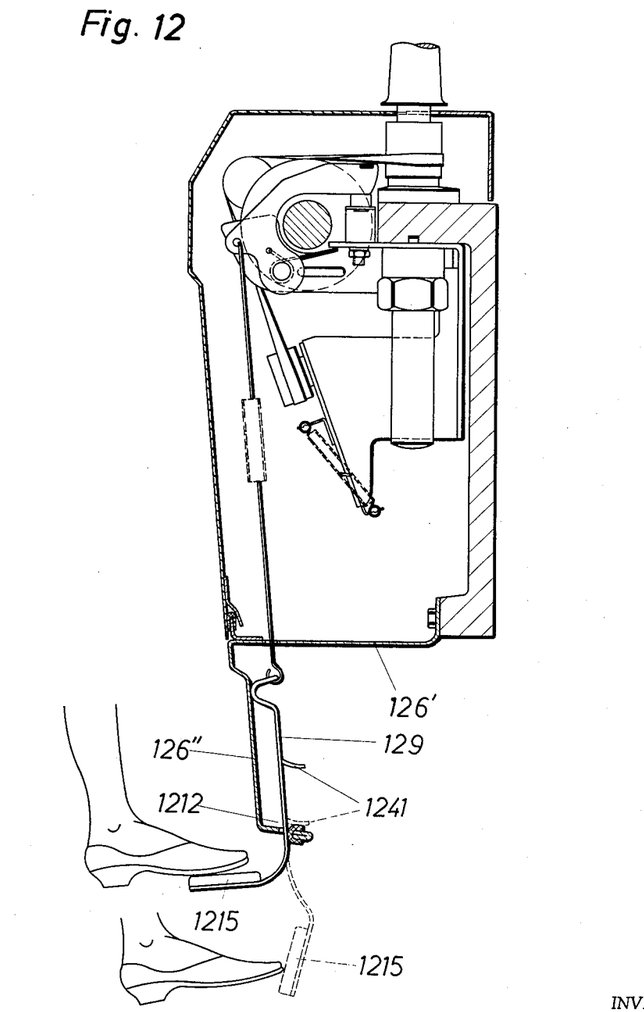
FIGURE 12 shows a view similar to FIGURE 1 of another modification of the invention, in which the foot pedal is mounted on a resilient connecting rod.

Still another modification of the invention is shown in FIGURE 12, in which the slide rod 129 is made of a strip of spring steel and provided at its lower forwardly bent end with a pedal 1215. Near this lower end slide rod 129 is guided in a slot 1212 in the angularly bent edge of the extension 126″ of the bottom 126′ of the housing. The rear side of slide rod 129 is provided with a projection 1241 which, when the brake is applied, engages upon the extension 126″ and thus prevents the slide rod 129 from being drawn further downwardly. If a very strong pressure is applied upon the pedal 1215, the spring steel strip will bend downwardly and toward the rear, as indicated in FIGURE 12 in dotted lines. The foot will therefore slide off the pedal before the brake mechanism can be overloaded and damaged.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a spinning or twisting machine having a frame, a plurality of parallel spindles rotatably mounted on said frame, a common drive shaft extending transversely to said spindles, a plurality of drive pulleys on said shaft, a plurality of idler pulleys each associated with one of said drive pulleys and one of said spindles, an individual driving belt connecting each of said spindles with one each of said idler pulleys and engaging with one of said drive pulleys to rotate a respective spindle, movable means for lifting said drive belt from said drive pulley and exerting through said belt a brake action on said spindle to stop the rotation thereof, spring means for normally maintaining said movable means in a position out of engagement with said belt, a spindle housing mounted on said frame and enclosing a part of said spindle and of said drive shaft and at least said drive and idler pulleys and said driving belt associated with said spindle, and selectively actuated means connected with said movable means within said spindle housing and guided by said housing and projecting therefrom for moving said movable means against the reaction of said spring means from said position into a further position in which said movable means is effective to lift said drive belt from said drive pulley and to exert said brake action on said spindle, and further spring means between said movable means and said selectively actuated means.

2. A device as defined in claim 1, further comprising means for locking said selectively actuated means to maintain said movable means in said housing in said operative position.

3. A device as defined in claim 1, further comprising associated means on said selectively actuated means and on said housing adapted to be interconnected with each other for locking said selectively actuated means when said movable means are in said operative position.

4. A device as defined in claim 1, in which said selectively actuated means comprises a slide rod, said housing having a bottom wall with an aperture therein, said slide rod extending through said aperture and guided by the edge thereof and a foot pedal on the lower end of said slide rod.

5. A device as defined in claim 1, in which said selectively actuated means comprises an angular slide rod having two arms, said housing having a bottom wall, a front wall, and an extension on said front wall extending downwardly beyond said bottom wall, said bottom wall having an aperture of a size substantially corresponding to the cross-sectional size of one of the arms of said slide rod, said extension having an elongated aperture extending in the downward direction and having a width substantially equal to the thickness of the second arm of said slide rod, said arms of said slide rod extending through and being slidably guided by the edges of said apertures, the end of said first arm being connected to said movable means in said housing, and a foot pedal secured to the end of said second arm and projecting from the front side of said extension.

6. A device as defined in claim 5, in which said elongated aperture in said extension has a lateral enlargement at its lower end having an upper edge extending at a substantially right angle to the direction of said aperture, said second arm adapted to be shifted laterally into said enlargement to lock said slide rod in the depressed position.

7. A device as defined in claim 5, in which said elongated aperature in said extension has a lateral enlargement at one side of its lower end having an upper locking edge extending at a substantantially right angle to the direction of said aperture, the upper side of said pedal being tapered downwardly from a point near its center toward both sides thereof whereby, when a foot is pressed upon said pedal at one side of its center to move said slide rod downwardly and said movable means in said housing to said operative position, a lateral component is exerted upon said second arm to press said second arm toward one side of said aperture and then into said enlargement and against said locking edge to lock said slide rod in the depressed position, while when the foot is pressed upon the other side of said pedal during the downward movement of said slide rod, said second arm is pressed toward the other side of said aperture so that said slide rod remains unlocked in the depressed position, and when the foot is pressed upon said other side of said pedal when said slide rod is in the locked position, said second arm will be pushed out of said enlargement to permit said slide rod to slide upwardly in said aperture and said movable means to move to said inoperative position.

8. A device as defined in claim 1, wherein said further spring means comprises a buffer spring within said housing.

9. A device as defined in claim 1, further comprising adjustable means for limiting the extent of the movement of said selectively actuated means in the direction toward said operative position of said movable means.

10. A device as defined in claim 1, further comprising a buffer spring within said housing interposed between said movable means and said selectively actuated means, and an adjustable means for limiting the extent of the movement of said selectively actuated means in the direction toward said operative position of said movable means and for also limiting the force of said spring.

11. A device as defined in claim 1, in which said selectively actuated means comprises a foot pedal, said device further comprising means rigidly connected to said housing for supporting an operator's foot at a substantially fixed distance from said pedal.

References Cited in the file of this patent

UNITED STATES PATENTS

| | | |
|---|---|---|
| 867,623 | Waddell | Oct. 8, 1907 |
| 2,216,648 | McHugh | Oct. 1, 1940 |
| 2,638,733 | Haythornthwaite et al | May 19, 1953 |
| 3,002,333 | Wright | Oct. 3, 1961 |

FOREIGN PATENTS

| | | |
|---|---|---|
| 1,244,774 | France | Sept. 19, 1960 |
| 1,262,284 | France | Apr. 17, 1961 |

OTHER REFERENCES

Deutscher: German printed application 1,088,398, Sept. 1, 1960 (Kl. 76c 13/03).